United States Patent
Lawson et al.

(10) Patent No.: US 10,773,556 B2
(45) Date of Patent: Sep. 15, 2020

(54) TIRE TREAD COMPRISING VARIABLE THICKNESS SIPES WITH MULTIPLE AREAS OF REDUCED THICKNESS

(71) Applicants: Robert Cecil Lawson, Pelzer, SC (US); Sadi Kose, Greer, SC (US)

(72) Inventors: Robert Cecil Lawson, Pelzer, SC (US); Sadi Kose, Greer, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 505 days.

(21) Appl. No.: 15/515,378

(22) PCT Filed: Sep. 30, 2015

(86) PCT No.: PCT/US2015/053346
§ 371 (c)(1),
(2) Date: Mar. 29, 2017

(87) PCT Pub. No.: WO2016/054278
PCT Pub. Date: Apr. 7, 2016

(65) Prior Publication Data
US 2017/0225517 A1    Aug. 10, 2017

(30) Foreign Application Priority Data

Sep. 30, 2014   (WO) ............... PCT/US2014/058351

(51) Int. Cl.
*B29D 30/06* (2006.01)
*B60C 11/12* (2006.01)

(52) U.S. Cl.
CPC ...... *B60C 11/1218* (2013.01); *B29D 30/0606* (2013.01); *B60C 11/12* (2013.01);
(Continued)

(58) Field of Classification Search
CPC ............. B60C 11/1281; B60C 11/1218; B60C 11/1204; B60C 11/12; B29D 2030/0613; B29D 30/0606
See application file for complete search history.

(56) References Cited

U.S. PATENT DOCUMENTS

| 1,413,190 A | 4/1922 | Rapson |
| 1,509,259 A | 9/1924 | Rett et al. |

(Continued)

FOREIGN PATENT DOCUMENTS

| CN | 1706629 A | 12/2005 |
| CN | 101045285 A | 10/2007 |

(Continued)

OTHER PUBLICATIONS

Machine translation for Japan 2000-102925 (Year: 2019).*
(Continued)

*Primary Examiner* — Steven D Maki
(74) *Attorney, Agent, or Firm* — Hahn Loeser & Parks LLP; Bret A. Hrivnak

(57) ABSTRACT

The present invention includes tire treads (10) and a method for forming tire treads (10) having a sipe (18) with a length extending between opposing terminal ends of the sipe and having a height and a thickness which is variable across the length and height of the sipe. The thickness of the sipe (18) includes a sipe portion arranged between the opposing terminal ends defining the sipe length and having a thick portion extending at least partially around a perimeter of a thin portion. The thin portion is substantially 0.2 millimeters or less thick and forms at least 40% of the surface area along each of the opposing sides of the sipe, the opposing sides being arranged on opposing sides of the sipe thickness.

18 Claims, 6 Drawing Sheets

(52) U.S. Cl.
CPC ...... *B60C 11/1204* (2013.01); *B60C 11/1259* (2013.01); *B60C 11/1263* (2013.01); *B60C 11/1281* (2013.01); *B29D 2030/0613* (2013.01); *B60C 2011/1254* (2013.01)

(56) References Cited

U.S. PATENT DOCUMENTS

| | | |
|---|---|---|
| 2,121,871 A | 6/1938 | Havens |
| 2,121,955 A | 6/1938 | Eger |
| 2,264,767 A | 12/1941 | Ofensend |
| 2,327,057 A | 8/1943 | Ofensend |
| 2,637,362 A | 5/1953 | Briscoe et al. |
| 2,696,863 A | 12/1954 | Ewart et al. |
| 2,732,589 A | 1/1956 | Steadman |
| 3,115,919 A | 12/1963 | Roberts |
| 3,373,790 A | 3/1968 | Newman et al. |
| 3,608,602 A | 9/1971 | Youngblood |
| 3,653,422 A | 4/1972 | French |
| 3,770,040 A | 11/1973 | De Cicco |
| 3,945,417 A | 3/1976 | Harrelson, Jr. |
| 3,998,256 A | 12/1976 | Verdier |
| 4,574,856 A | 3/1986 | Graas |
| 4,703,787 A | 11/1987 | Ghilardi |
| 4,723,584 A | 2/1988 | Yamaguchi et al. |
| 4,794,965 A | 1/1989 | Lagnier |
| 4,832,099 A | 5/1989 | Matsumoto |
| 4,994,126 A | 2/1991 | Lagnier |
| 5,031,680 A | 7/1991 | Kajikawa et al. |
| 5,248,357 A | 9/1993 | Miyanaga et al. |
| 5,316,063 A | 5/1994 | Lagnier |
| 5,342,462 A | 8/1994 | King et al. |
| 5,445,691 A | 8/1995 | Nakayama et al. |
| 5,503,207 A | 4/1996 | Ochiai et al. |
| 5,535,798 A | 7/1996 | Nakamura |
| 5,769,977 A | 6/1998 | Masaoka |
| 5,783,002 A | 7/1998 | Lagnier |
| 6,012,499 A | 1/2000 | Masaoka |
| 6,102,092 A | 8/2000 | Radulescu |
| 6,116,310 A * | 9/2000 | Shinohara ............... B60C 11/12 152/209.21 |
| 6,123,130 A | 9/2000 | Himuro et al. |
| 6,143,223 A | 11/2000 | Lopez |
| 6,196,288 B1 | 3/2001 | Radulescu et al. |
| 6,264,453 B1 | 7/2001 | Jacobs et al. |
| 6,315,018 B1 | 11/2001 | Watanabe |
| 6,382,283 B1 | 5/2002 | Caretta |
| 6,408,910 B1 | 6/2002 | Lagnier et al. |
| 6,412,531 B1 | 7/2002 | Janajreh |
| 6,439,284 B1 | 8/2002 | Fontaine |
| 6,443,200 B1 | 9/2002 | Lopez |
| 6,461,135 B1 | 10/2002 | Lagnier et al. |
| 6,467,517 B1 | 10/2002 | Radulescu |
| 6,668,885 B2 | 12/2003 | Ishiyama |
| 6,668,886 B1 | 12/2003 | Iwamura |
| 6,761,197 B2 | 7/2004 | Carra et al. |
| 6,776,204 B2 | 8/2004 | Cesarini et al. |
| 6,799,616 B2 | 10/2004 | Himuro |
| 7,017,634 B2 | 3/2006 | Radulescu et al. |
| 7,143,799 B2 | 12/2006 | Collette et al. |
| 7,249,620 B2 | 7/2007 | Croissant et al. |
| 7,338,269 B2 | 3/2008 | Delbet et al. |
| 7,507,078 B2 | 3/2009 | Nguyen et al. |
| 7,793,692 B2 | 9/2010 | Nguyen et al. |
| 8,267,679 B2 | 9/2012 | Cuny et al. |
| 8,276,629 B2 | 10/2012 | Bonhomme |
| 8,393,365 B2 | 3/2013 | Janesh et al. |
| 9,022,083 B2 | 5/2015 | Voss et al. |
| 9,387,728 B2 | 7/2016 | Warfford et al. |
| 9,981,507 B2 | 5/2018 | Warfford et al. |
| 2002/0033214 A1 | 3/2002 | Carra et al. |
| 2002/0142056 A1 | 10/2002 | Aperce et al. |
| 2005/0081972 A1 | 4/2005 | Lopez |
| 2005/0121124 A1 | 6/2005 | Tsubono |
| 2005/0183807 A1 | 8/2005 | Hildebrand |
| 2006/0027295 A1 | 2/2006 | Knispel et al. |
| 2006/0088618 A1 | 4/2006 | Radulescu et al. |
| 2007/0084534 A1 | 4/2007 | Byrne |
| 2007/0095447 A1 | 5/2007 | Nguyen et al. |
| 2007/0199634 A1 | 8/2007 | Sakamaki |
| 2007/0295434 A1 | 12/2007 | Nguyen et al. |
| 2008/0029193 A1 * | 2/2008 | Perrin ............... B60C 11/12 152/209.18 |
| 2008/0128062 A1 | 6/2008 | Lopez |
| 2008/0152745 A1 | 6/2008 | Nguyen et al. |
| 2008/0163970 A1 | 7/2008 | Ohara |
| 2009/0065115 A1 | 3/2009 | Mathews |
| 2009/0159167 A1 | 6/2009 | Scheuren |
| 2009/0218020 A1 * | 9/2009 | Sumi ............... B60C 11/12 152/209.18 |
| 2009/0301622 A1 | 12/2009 | Brown |
| 2010/0243119 A1 | 9/2010 | Miyazaki |
| 2010/0300626 A1 | 12/2010 | Nguyen et al. |
| 2011/0017374 A1 | 1/2011 | Bervas et al. |
| 2011/0120610 A1 | 5/2011 | Fugier et al. |
| 2011/0277898 A1 | 11/2011 | Barraud et al. |
| 2012/0048439 A1 | 3/2012 | Christenbury |
| 2013/0014873 A1 | 1/2013 | Voss et al. |
| 2013/0164401 A1 | 6/2013 | Dusseaux |
| 2015/0053320 A1 | 2/2015 | Mathonet et al. |
| 2017/0021675 A1 | 1/2017 | Kose et al. |
| 2017/0246820 A1 | 8/2017 | Lawson |

FOREIGN PATENT DOCUMENTS

| | | |
|---|---|---|
| CN | 101148020 A | 3/2008 |
| DE | 2024279 A1 | 3/1971 |
| DE | 19506697 A1 | 8/1996 |
| DE | 102006010050 A1 | 9/2007 |
| EP | 540340 A2 | 5/1993 |
| EP | 721853 A1 | 7/1996 |
| EP | 925907 A1 | 6/1999 |
| EP | 1125709 A1 | 8/2001 |
| EP | 1243390 A2 | 9/2002 |
| EP | 1782970 A1 | 5/2007 |
| EP | 1920951 A1 | 5/2008 |
| EP | 1935671 A2 | 6/2008 |
| EP | 1938939 A1 | 7/2008 |
| EP | 2376297 B1 | 10/2012 |
| EP | 2570273 A1 | 3/2013 |
| FR | 2730951 A1 | 8/1996 |
| FR | 2909588 A1 | 6/2008 |
| FR | 2971732 A1 | 8/2012 |
| GB | 474588 A | 11/1937 |
| GB | 2061837 A | 5/1981 |
| JP | 62268707 A | 11/1987 |
| JP | 02060805 A | 3/1990 |
| JP | 02-303908 A * | 12/1990 |
| JP | 2310108 A | 12/1990 |
| JP | H02-303908 A | 12/1990 |
| JP | 03090317 A | 4/1991 |
| JP | 03112705 A | 5/1991 |
| JP | H03-189112 A | 8/1991 |
| JP | 03279006 A | 10/1991 |
| JP | 05169913 A | 7/1993 |
| JP | 5338412 A | 12/1993 |
| JP | 2000-102925 A * | 4/2000 |
| JP | 2000102925 A | 4/2000 |
| JP | 2001063323 A | 3/2001 |
| JP | 2001130227 A | 5/2001 |
| JP | 2002501458 A | 1/2002 |
| JP | 02-310108 A * | 10/2002 |
| JP | 2003182314 A | 7/2003 |
| JP | 2003211922 A | 7/2003 |
| JP | 2004009886 A | 1/2004 |
| JP | 2005104194 A | 4/2005 |
| JP | 2005262973 A | 9/2005 |
| JP | 2006051863 A | 2/2006 |
| WO | 9948707 A1 | 9/1999 |
| WO | 0238399 A2 | 5/2002 |
| WO | 2010030276 A1 | 3/2010 |
| WO | 2010039148 A1 | 4/2010 |
| WO | 2010072523 A1 | 7/2010 |
| WO | 2012058171 A1 | 5/2012 |
| WO | 2013011335 A1 | 1/2013 |

(56) References Cited

FOREIGN PATENT DOCUMENTS

| WO | 2015080771 A1 | 6/2015 |
| WO | 2015080772 A1 | 6/2015 |
| WO | 2015080799 A1 | 6/2015 |
| WO | 2016053307 A1 | 4/2016 |

OTHER PUBLICATIONS

Translation for Japan 02-310108 (Year: 2019).*
Translation for Japan 02-303908 (Year: 2019).*
ISR with WO for application PCT/US2014/058351 dated Sep. 30, 2014.
PCT/US2015/053346 International Search Report and Written Opinion dated Dec. 17, 2015, 13 pages.

* cited by examiner

TIRE TREAD COMPRISING VARIABLE THICKNESS SIPES WITH MULTIPLE AREAS OF REDUCED THICKNESS

This application claims priority to, and the benefit of, International Application No. PCT/US2014/058351, filed Sep. 30, 2014 with the US Receiving Office, which is hereby incorporated by reference.

BACKGROUND OF THE INVENTION

Field of the Invention

This invention relates generally to tire treads, and more particularly, to tire treads having sipes, where at least a portion of the sipe has a reduced thickness.

Description of the Related Art

Tire treads are known to include a pattern of voids and/or discontinuities such arranged along a ground-engaging side of the tread to provide sufficient traction and handling during particular conditions. For example, grooves provide voids into which water, mud, or other environmental materials may be diverted to better allow the tread surface to engage a ground surface. By providing the pattern of voids/discontinuities, tread elements are formed along the tread, where the outer portion of said elements are arranged along the outer side of the tread to provide traction as the outer side engages the ground surface (that is, a surface upon with the tire operates, which is also referred to herein as a tire operating surface).

It is well known that the tire tread wears during tire operation due to the generation of slip between the outer side of the tread and the tire operating surface. This not only occurs when the rolling direction of the tire is biased relative to the direction of vehicle travel to generate lateral traction forces, such as when a vehicle is changing direction during turning or cornering maneuvers, but also when the vehicle is traveling in a straight line.

In certain instances, it is advantageous to employ sipes, which are narrow voids or slits that generally close at some instance within a tire footprint, which is the area of contact between the tire and the tire operating surface. For example, sipes can offer benefits in traction, such as in snow. Sipes, however, can reduce the stiffness of a tire tread, resulting in undesired tread wear. Therefore, there is a need to increase tread stiffness by reducing the thickness of sipes, which in turn will reduce the occurrence of wear when employing the use of sipes in tire treads.

SUMMARY OF THE INVENTION

Particular embodiments of the present invention include tire treads having a sipe having a length extending between opposing terminal ends of the sipe and having a height and a thickness which is variable. Particular embodiments of the present invention include a method for forming the same.

Particular embodiments of a tire tread having a sipe and methods for forming the same include a tire tread comprising a length extending in a lengthwise direction, the lengthwise direction being a circumferential direction when the tread is arranged on a tire, a width extending in a lateral direction, the lateral direction being perpendicular to the lengthwise direction and a thickness extending in a depthwise direction from an outer, ground-engaging side of the tread, the depthwise direction being perpendicular to both the lengthwise direction and the widthwise direction of the tread. The sipe has a length extending between opposing terminal ends of the sipe. A height and a thickness of the sipe is variable across the length and height of the sipe.

In various embodiments, the thickness of the sipe includes a sipe portion arranged between the opposing terminal ends defining the sipe length and having a thick portion extending at least partially around a perimeter of a thin portion. In certain instances, where the thin portion is substantially 0.2 millimeters or less thick and forms at least 40% of the surface area along each of the opposing sides of the sipe, the opposing sides are arranged on opposing sides of the sipe thickness.

The foregoing and other embodiments, objects, features, and advantages of the invention will be apparent from the following more detailed descriptions of particular embodiments of the invention, as illustrated in the accompanying drawings wherein like reference numbers represent like parts of the invention.

DETAILED DESCRIPTION OF THE DRAWINGS

DETAILED DESCRIPTION OF PARTICULAR EMBODIMENTS

The present invention includes methods for forming a tire tread, tire treads, and tires including said treads, where any such tread includes one or more sipes having a variable thickness. The variable thickness includes a first sipe portion having a first thick portion extending at least partially around a perimeter of a first thin portion and a second sipe portion having a second thick portion extending at least partially around a perimeter of a second thin portion, the first sipe portion spaced apart from the second sipe portion along the sipe length. In providing one or more sipes, it is understood that one sipe or a plurality of sipes may be provided in any tread. By virtue of employing such treads, a reduction in the sipe thickness is achieved over a larger area of the sipe to increase the local tread stiffness, without sacrificing a corresponding sipe-molding member's durability. This results in reduced tread wear and improved rolling resistance while also continuing to obtain tire/vehicle performance benefits commonly achieved utilizing one or more of such sipes.

Figure 1:
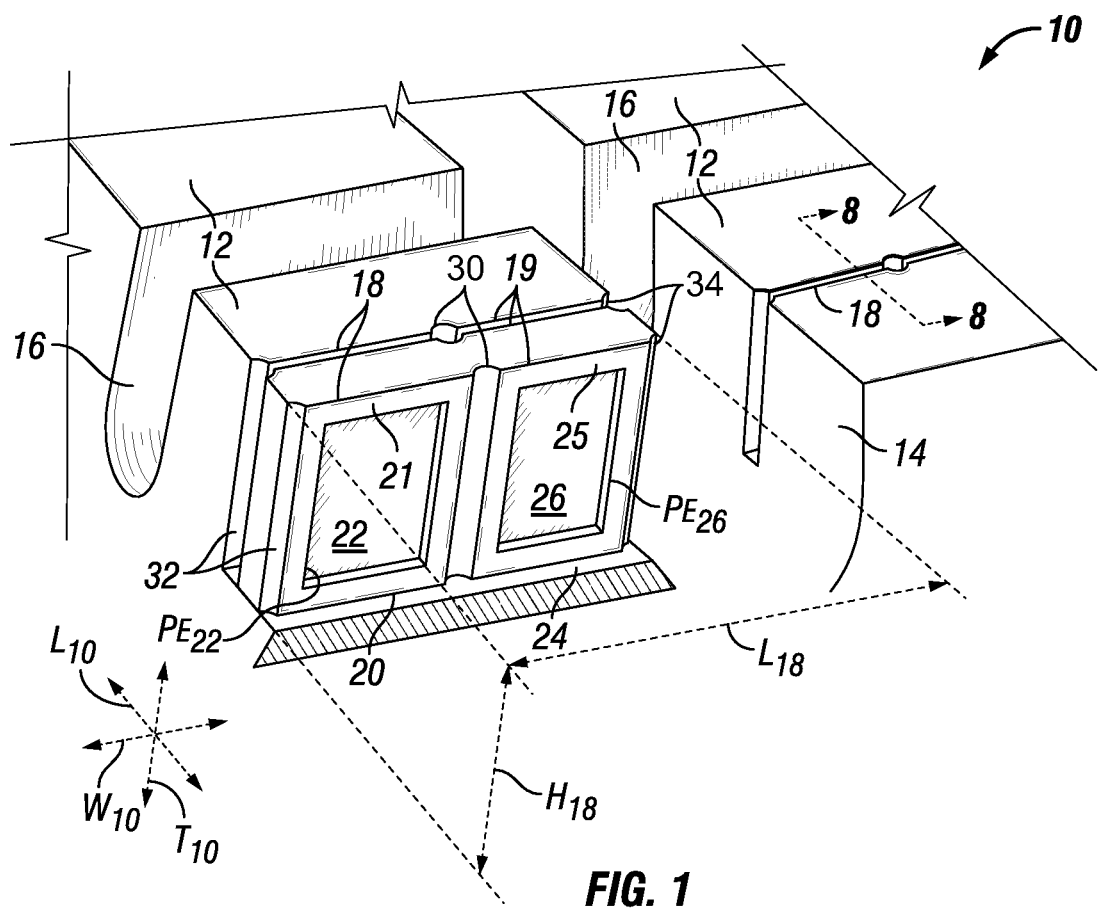
FIG. 1 is a partial perspective view of a tire tread showing a plurality of tread blocks separated by lateral and longitudinal grooves, the longitudinal grooves, where the tread blocks include one or more sipes, in accordance with an embodiment of the invention.

With regard to the tire treads described herein, having the noted one or more sipes and a void feature in fluid connection with each of the one or more sipes, it is appreciated that each such tread includes a length, width, and thickness. The length of the tread extends in a lengthwise direction. As the tread may be formed with the tire, or separately for later installation on the tire, such as during retreading operations, for example, the lengthwise direction of the tread is a circumferential (that is, annular) direction when the tread is arranged on a tire. The width extends in a lateral direction, the lateral direction being perpendicular to the lengthwise direction, while the thickness extends in a depthwise direction from an outer, ground-engaging side of the tread, the depthwise direction being perpendicular to both the lengthwise direction and the widthwise direction of the tread. By way of example, an exemplary tire tread is partially shown in FIG. 1, where tire tread 10 includes a plurality of tread blocks 12 separated by longitudinal grooves 14 and lateral grooves 16. The tire tread extends in directions of the tread length $L_{10}$, tread width $W_{10}$, and tread thickness $T_{10}$. Each tread block 12 includes one or more sipes 18 each having a length $L_{18}$ extending at least partially in a direction of the tread width $W_{10}$, a height $H_{18}$ extending at least partially in a direction of the tread depth $T_{10}$ and perpendicular to the tread length, and a thickness $T_{18}$. Each sipe has a width $W_{18}$ extending perpendicular to its height $H_{18}$ and length $L_{18}$. As best seen in FIG. 1, each sipe 18 is arranged between opposing sides or surfaces 19 of the tread within the tread thickness. It is appreciated that any such sipe may be arranged in any desired configuration within the tread, such as the length of the sipe extending in a direction of the tread length.

With specific regard to the sipes, as noted above, particular embodiments of such tire treads include a sipe having a length extending between opposing terminal ends of the sipe, a height, a width, and a thickness that is variable across the length and height of the sipe. The variableness in the thickness is provided by a sipe portion arranged between the opposing terminal ends defining the sipe length and having a thick portion extending at least partially around a perimeter of a thin portion. It is appreciated that the sipe may have a plurality of sipe portions having thick and thin portions as described. For example, in certain embodiments, the sipe portion includes a first sipe portion having a first thick portion extending at least partially around a perimeter of a first thin portion and a second sipe portion having a second thick portion extending at least partially around a perimeter of a second thin portion, the first sipe portion spaced apart from the second sipe portion along the sipe length. In certain embodiments, the first thick portion extends substantially along two (2) sides of the first thin portion, 50% around the first thin portion, substantially along three (3) sides of the first thin portion, at least 75% around the first thin portion, or substantially around the first thin portion. Additionally, or in the alternative, in other certain embodiments, the second thick portion extends substantially along two (2) sides of the second thin portion, 50% around the second thin portion, substantially along three (3) sides of the second thin portion, at least 75% around the second thin portion, or substantially around the second thin portion. In certain instances, a first upright void feature (described further below) is arranged between the first and second sipe portions. In other variations, the sipe portion includes a third sipe portion, the third sipe portion having a third thick portion extending at least partially around a perimeter of a third thin portion (such as any manner described above in association with the first and second sipe portions), the third sipe portion being spaced apart from the first and second sipe portions along the sipe length, where the second upright void feature is arranged between the second and third sipe portions, where the first, second, and third thin portions together form at least 40% of the surface area defining each of the opposing sides of the sipe. In certain instances, a first upright portion is arranged between the first and second sipe portions and a second upright portion is arranged between the second and third sipe portions.

By virtue of providing first and second thick portions separately around at least a portion of the first and second thin portions, respectively, the additional mass provides strength and stiffness permitting the thinner portion to exist in a member for molding the sipe (referred to as a sipe-molding member), as the thin portion is better able to withstand the demolding forces that arise when a tire tread (which may or may not form a portion of a tire, as a tread can be molded separate from a tire, such as for producing a tread for tire retreading operations) is demolded from the sipe-molding member. As to the thicknesses of the sipe, in particular embodiments, it is understood that each of the first and second thin portions is thinner than each of the first and second thick portions. For example, in certain embodiments, the thick portion is at least 0.4 millimeters (mm) thick, 0.5 mm thick, or 0.5 to 1.9 mm thick, and the thin portion less than 0.4 mm thick. In particular variations, the thin portion is 0.2 mm or less thick or 0.1 to 0.2 mm thick. By providing thick portions above 0.4 mm, additional strength and rigidity is provided that may allow a sipe-molding member to generate thinner thin portions of the sipe and/or thin portions that form a greater surface area of the sipe, that is, at thicknesses of 0.2 mm or less. As to the size of each of the first and second thin portions, in particular embodiments, the first and second thin portions together form at least 40% of the surface area along or defining each of the opposing sides of the sipe, the opposing sides being arranged on opposing sides of the sipe thickness. In other variations, the thin portion forms upwards of, or at least, 60% of the surface area along or defining each of the opposing sides of the sipe.

Figure 2:
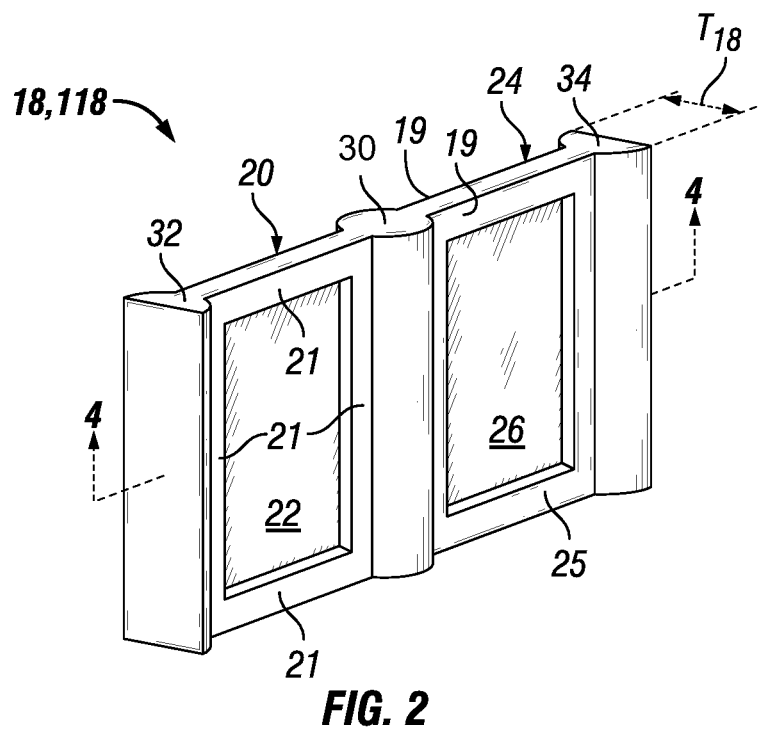
FIG. 2 is a perspective view of a sipe-molding element for forming the sipes shown in FIG. 1, in accordance with an embodiment of the invention.
Figure 3:
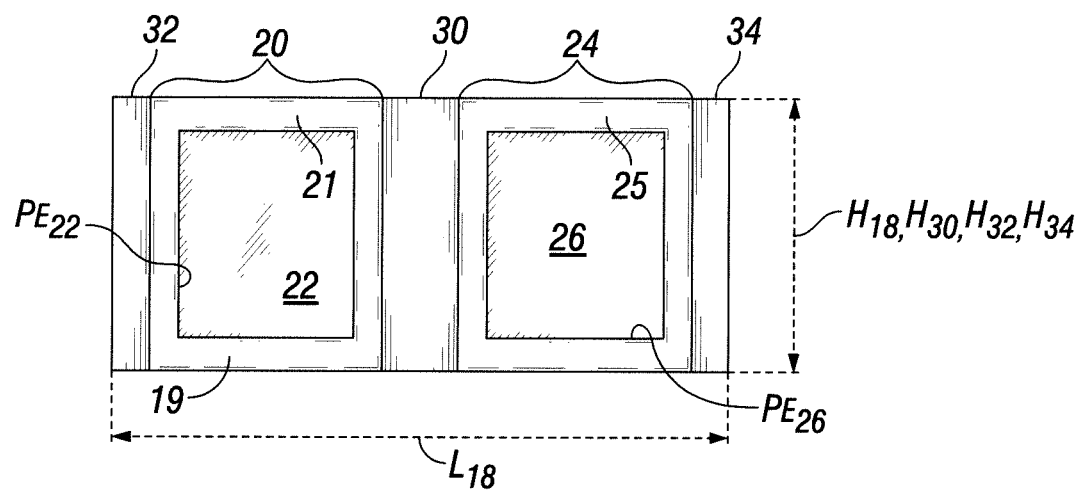
FIG. 3 is a front elevation view of the sipe-molding element shown in FIG. 2.
Figure 4:
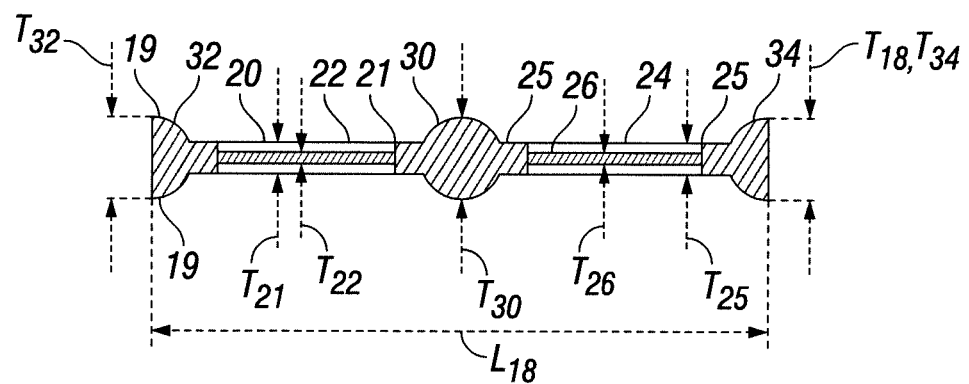
FIG. 4 is a sectional view of the sipe-molding element shown in FIG. 2, taken along line 4-4.

With reference to FIGS. 2-4, an exemplary embodiment of a sipe 18 shown, representing each sipe shown in FIG. 1, but which also represents a sipe-molding member 118 as the sipe shown is a void representing the molded void formed by the sipe-molding member. In particular, sipe 18 is shown to have a variable thickness $T_{18}$ extending in the direction of the length and height of the sipe. The variableness in the thickness is at least provided by a first sipe portion 20 having a first thick portion 21 extending at least partially around a perimeter of a first thin portion 22 and a second sipe portion 24 having a second thick portion 25 extending at least partially around a perimeter of a second thin portion 26, the first sipe portion spaced apart from the second sipe portion along the sipe length $L_{18}$. Of course, first thin portion 22 has a thickness $T_{22}$ that is less than a thickness $T_{21}$ of the first thick portion 21, while second thin portion 26 has a thickness $T_{26}$ that is less than a thickness $T_{25}$ of the second thick portion 25. It is apparent in FIGS. 2-3 that first thick portion 21 completely surrounds first thin portion 22 along perimeter $PE_{22}$, while second thick portion 25 completely surrounds second thin portion 26 along perimeter $PE_{26}$. It is also noted that in FIG. 3, it is apparent that the first and second thin portions together form at least 40% of the surface area along side of the side of the sipe shown, where the side shown represents one of the pair of opposing sides defining the sipe thickness.

To provide additional strength and stiffness to the corresponding sipe-molding member, for the purpose of providing areas of reduced thinness to form narrower sipe thicknesses and/or to form larger areas or spans of narrow sipe thicknesses, the sipe-molding member includes one or a plurality of thickened molding portions, which, in certain instances, comprises one or more upright void features. In particular embodiments, a first upright void feature is arranged between and in fluid connection with each of the first and second sipe portions. The first upright void feature, may comprise any thickness extending in the direction of the sipe thickness, such as being equal to or greater than substantially 0.6 millimeter and being greater than the thickness of the sipe portion. In certain instances, as mentioned above, the first upright void feature is arranged between first and second sipe portions. In other instances, as mentioned above, a second upright void feature is additionally provided, the first upright void feature is arranged between first and second sipe portions and the second upright void feature is arranged between second and third sipe portions. In each case, the first and second upright void portions are spaced apart from each of the terminal ends of the sipe length. In can be said that the first and second upright void portions are arranged intermediately along the sipe length between the opposing terminal ends of the sipe length.

In further exemplary embodiments, configured to form a first upright void feature arranged between and in fluid connection with each of the first and second sipe portions, a second upright void feature arranged in fluid connection with the first sipe portion, the first sipe portion arranged between the first and second upright void features in a direction of the sipe length, and a third upright void feature arranged in fluid connection with the second sipe portion, the second sipe portion arranged between the first and third upright void features in a direction of the sipe length. Fluid connection connotes that the void formed by one void feature is directly connected to the void of a corresponding sipe portion.

In any embodiments, any and each of the first, second, and third upright void features extend, such as along its length, primarily in a direction of the sipe height (that is, the sipe depth). This lengthwise extension may occur along any linear or non-linear path. A non-linear path may comprise an arcuate path or an undulating path which may be curvilinear or formed of a plurality of linear segments, such as a zig-zag path. In extending primarily in a direction of the sipe height, when separating the average direction of extension into vectors extending in the direction of the sipe length, depth, and width, the vector extending in the direction of the sipe height is greatest among the different vectors. In other embodiments, each of the first, second, and third upright void features can be described as extending primarily in a direction of the tread thickness. When a tread is arranged along a tire, this primary direction is a radial direction. As to the thickness of each of the first, second, and third upright void features, in particular embodiments, each has a thickness extending in the direction of the sipe thickness greater than the thickness of the first and second sipe portions. In more specific embodiments, the thickness of each of the first, second, and third upright void features is at least substantially 0.6 millimeter. Other thicknesses may be employed, whether thinner or thicker. It is also appreciated that each upright void feature may be shaped in any manner, such as having any shaped cross-section, and may extend continuously, discontinuously, or a partial or full height of a sipe.

By way of example, with reference again to the embodiment of FIGS. 1-4, a plurality of upright void features are shown within sipe 18. In particular, sipe 18 includes a first upright void feature 30 arranged between and in fluid connection with each of the first and second sipe portions 20, 24. Sipe 18 also includes a second upright void feature 32 arranged in fluid connection with the first sipe portion 20, the first sipe portion arranged between the first and second upright void features 30, 32 in a direction of the sipe length $L_{18}$, and a third upright void feature 34 arranged in fluid connection with the second sipe portion 24, the second sipe portion arranged between the first and third upright void features 30, 34 in a direction of the sipe length $L_{18}$. Each of the first, second, and third upright void features 30, 32, 34 extend primarily in a direction of the sipe height $H_{18}$, and have a thickness $T_{30}$, $T_{32}$, $T_{34}$ extending in the direction of the sipe thickness $T_{18}$ that is greater than the thickness $T_{20}$, $T_{24}$ of the first and second sipe portions. Finally, it is noted that each of the upright void features 30, 32, 34 has a length $L_{30}$, $L_{32}$, $L_{34}$ extending along a linear path continuously the full height $H_{18}$ of the sipe, and has a circular or semi-circular cross-section. It is noted that the first upright void feature is arranged intermediately along the sipe between and spaced apart from the opposing terminal ends of the sipe length, while each of the second and third upright void features are arranged at each of the opposing terminal ends of the sipe length. These second and third upright void features are optional, and may not be included in certain embodiments whether or not one or more upright void features are arranged intermediately along the sipe length.

Additional strength and stiffness may also be generated in a corresponding sipe-molding member, particular embodiments of the sipe-molding member includes a lateral void feature extending primarily in a direction of the sipe length. In extending primarily in a direction of the sipe length, when separating the average direction of extension into vectors extending in the direction of the sipe length, depth, and width, the vector extending in the direction of the sipe length is greatest among the different vectors. The lateral void feature has a thickness extending in the direction of the sipe thickness greater than the thickness of the first and second sipe portions. In more specific embodiments, the lateral void feature has a thickness at least equal to substantially 0.6 millimeters.

It is appreciated that the lateral void feature may be shaped in any manner, such as having any shaped cross-section, and may extend continuously, discontinuously, or a partial or full length of a sipe. In certain instances, the lateral void feature at least spans each of the first and second sipe portions in a direction of the sipe length. In other instances, the lateral void feature extends substantially the full length of the sipe. While the lateral void feature may or may not be directly connected with any combination of the first, second, and third upright void features, in certain instances, the lateral void feature is in fluid connection with each of the first, second, and third upright void features. It is also appreciated that the lateral void feature may be arranged at any location along the height of the sipe. For example, in certain instances, the lateral void feature is arranged at a bottom of the sipe in the direction of the tread depth, that is, submerged below the outer, ground-engaging side, offset by the height of the sipe. While the thickness of the lateral void feature may be any size, in particular embodiments it is greater than the thickness of each of the first, second, and third upright void features.

Figure 5:
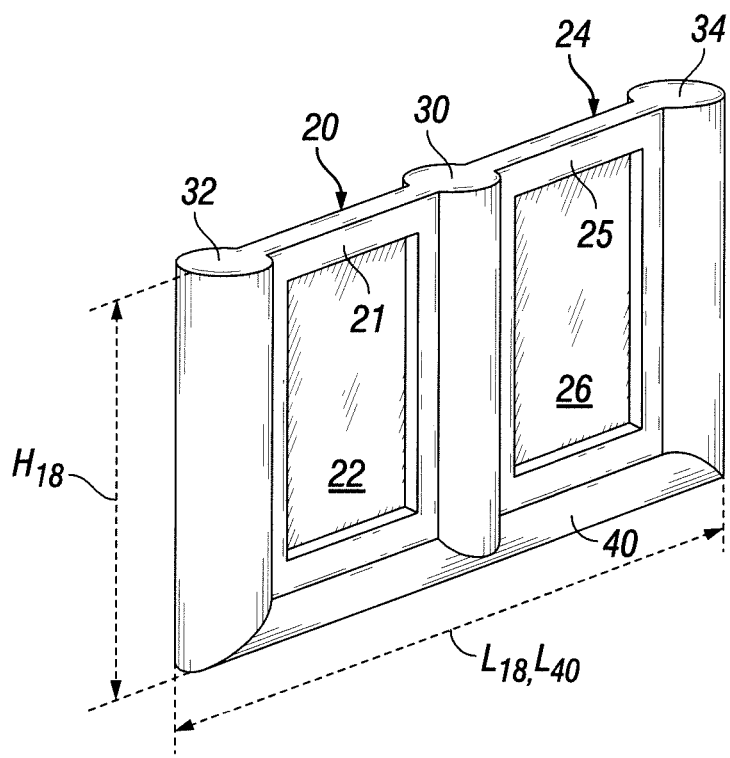
FIG. 5 is a perspective view of a sipe-molding element for forming a sipe having a void of the same design, in accordance with another embodiment of the invention, the sipe including a lateral void feature arranged at a bottom of the sipe.
Figure 6:
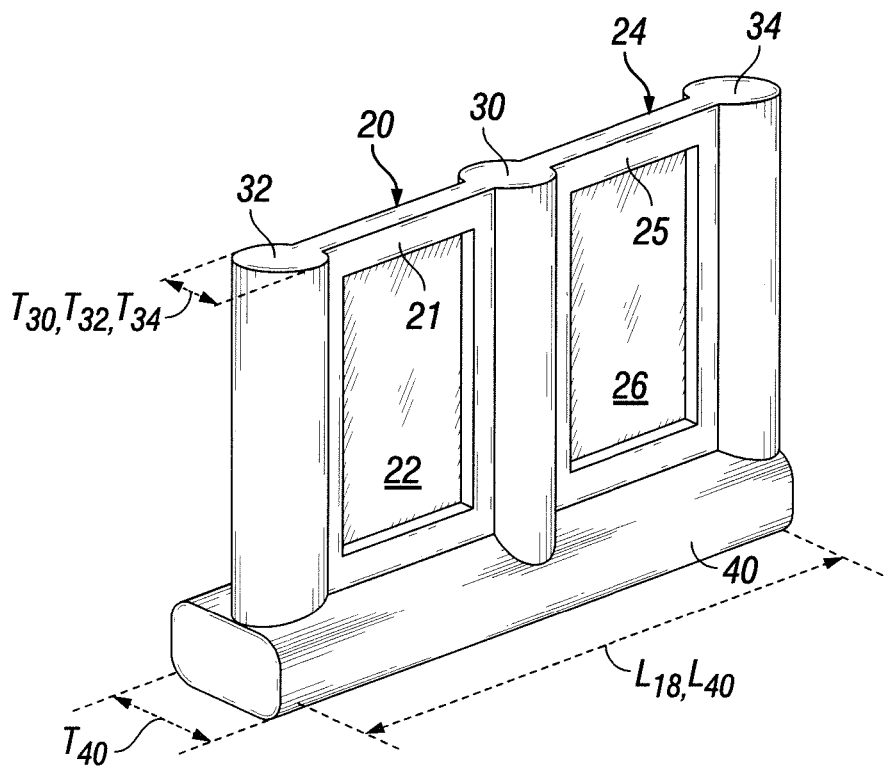
FIG. 6 is a perspective view of a sipe-molding element for forming a sipe having a void of the same design, in accordance with another embodiment of the invention, the sipe including a lateral void feature forming a groove arranged at a bottom of the sipe.

By way of example, with reference to FIGS. 5-6, different lateral void features are shown in different embodiments. In FIG. 5, a lateral void feature 40 is shown extending primarily in a direction of the sipe length $L_{18}$. Lateral void feature 40 has a thickness $T_{40}$ extending in the direction of the sipe thickness $T_{18}$ greater than the thickness $T_{20}$, $T_{24}$ of the first and second sipe portions 20, 24. In the embodiment shown, the length $L_{40}$ of the lateral void feature 40 spans each of the first and second sipe portions 20, 24 in a direction of the sipe length $L_{18}$ and extends substantially the full length of the sipe $L_{18}$. In doing so, lateral void feature 40 is directly connected (in fluid connection) with each of the first, second, and third upright void features 30, 32, 34. Lateral void feature is shown arranged at a bottom of the sipe 18 in the direction of the tread depth. With reference to the embodiment shown in FIG. 6, the thickness $T_{40}$ of lateral void feature 40 is greater than the thickness of each of first, second, and third upright void features 30, 32, 34, such as to provide a submerged groove.

Figure 7:
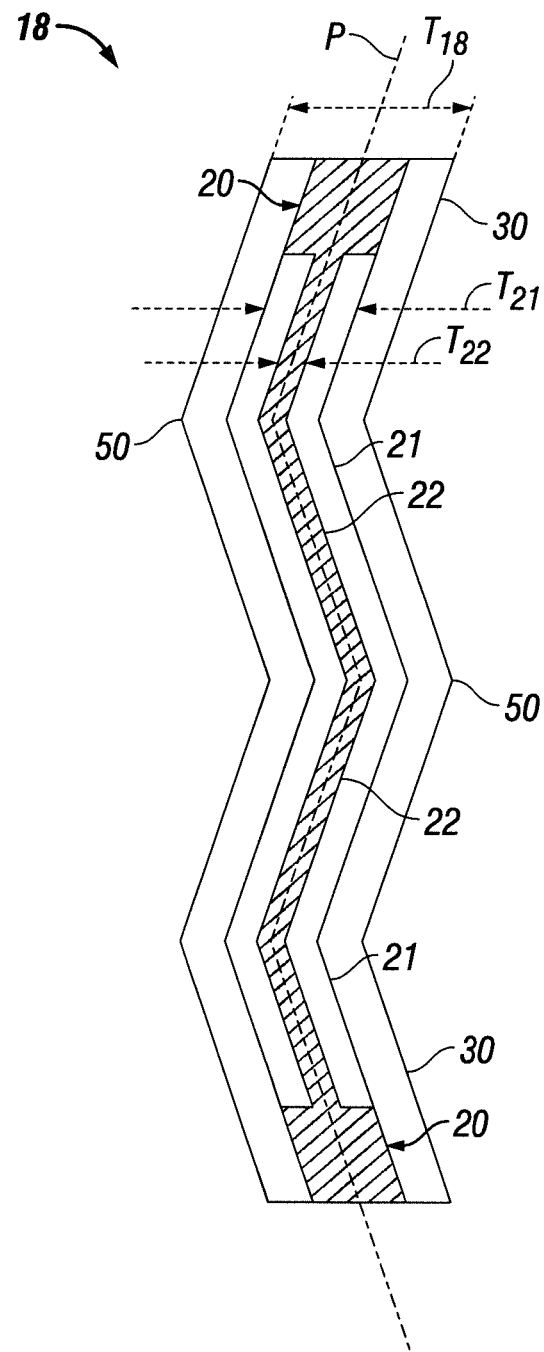
FIG. 7 is a sectional view of a sipe-molding element for forming a sipe having a void of the same design, where the sipe has a thickness extending in a direction of the sipe depth along an undulating path, in accordance with another embodiment of the invention.

It is appreciated that any and all features of the sipe may extend along any linear or non-linear path in any direction to increase the sipe strength and rigidity. A non-linear path may form an arcuate or undulating path. An undulating path may form a curvilinear path or a path formed of multiple line segments, such as a zig-zagged path. For example, in certain instances, the thickness of the sipe, including the first and second sipe portions, undulates back and forth in a direction of the sipe thickness as the sipe extends in a direction of the sipe height or width to form a plurality of undulations. With reference to FIG. 7, an exemplary embodiment shows a sipe 18 and its thickness $T_{18}$, together with the first and second sipe portions 20, 24, undulating back and forth in a direction of the sipe thickness or width as the sipe extends in a direction of the sipe height (along undulating path P) to form a plurality of undulations 50. In other variations, the sipe thickness may also undulate (additionally or in the alternative) as the sipe extends in a direction of the sipe length. For any undulating path, each of the plurality of undulations may have any desired amplitude and spacing. For example, in certain instances, the plurality of undulations have an amplitude of at least 1 millimeter (mm) or at least 2 mm and/or are spaced apart by a distance of 3.5 mm or less or at least 1.0 mm.

Additionally, surface geometry may be added to any sipe described or contemplated herein, for the purpose of increasing the surface friction between, and improved interlocking between, opposing sides of the tread between which the sipe is arranged. In turn, improvements in wear, dry braking and rolling resistance may be achieved. Additionally, because the new surface geometry increases the rigidity of the sipe-forming mold member, a wider sipe-forming area along said mold member may be increased and/or the thickness of the sipe-forming area may be reduced, each of which can lead to further improvements in wear, dry braking and rolling resistance.

As to the surface geometry for application to any desired sipe, and therefore for application to one or both of the opposing tread sides or surfaces between which the sipe is arranged and defined, the resulting geometry provides surface geometry features comprising a plurality of projections and/or recesses that form a planar or non-planar or contoured surface, much like a textured surface, such that opposing sides of the tread between which the sipe is arranged observe increased friction when relative movement between the two sides is attempted during tire operation. In applying the surface geometry to the sipe, the surface geometry is also applied to the plurality of undulations, or, in other words, the sipe body. It is appreciated that spaced apart projections form an interstitial space arranged between the projections, the interstitial space being a recess relative to the projections. Of course, the opposite is true as well, where spaced apart recesses form an interstitial space arranged between the recesses, the interstitial space being a projection relative to the recesses. Therefore, projections and recesses are used with reference to each other, and not as to how each is formed along a surface. Additionally, it is noted that a projection of the sipe is associated with a corresponding recess on one of the opposing sides or surfaces, and vice versa. In certain embodiments, the surface geometry features are formed such that surface geometry features arranged on the opposing sides generally interlock, such as when the opposing sides are mirrored opposites of each other, for example.

Figure 8:
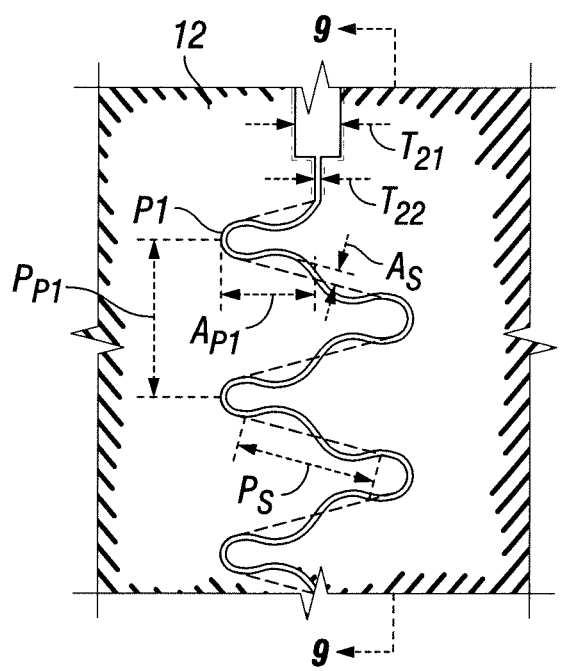
FIG. 8 is a partial sectional view of a sipe shown in FIG. 1 taken along line 8-8.
Figure 9:
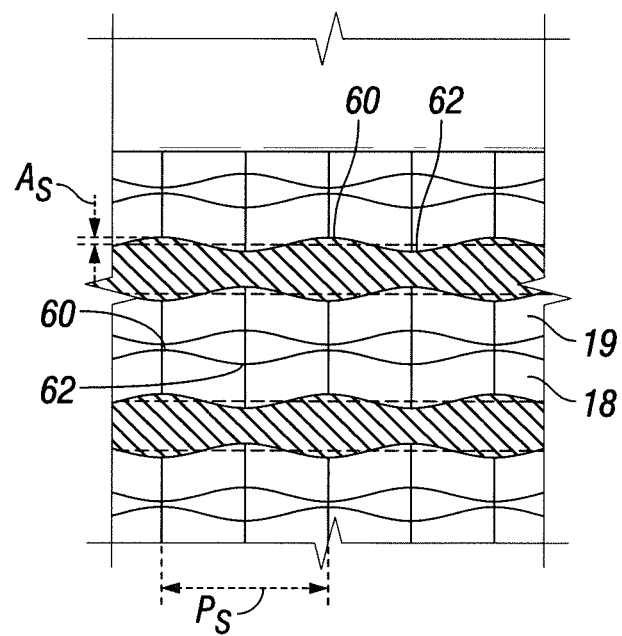
FIG. 9 is a partial sectional view of the sipe shown in FIG. 8 taken along line 9-9.
Figure 10:
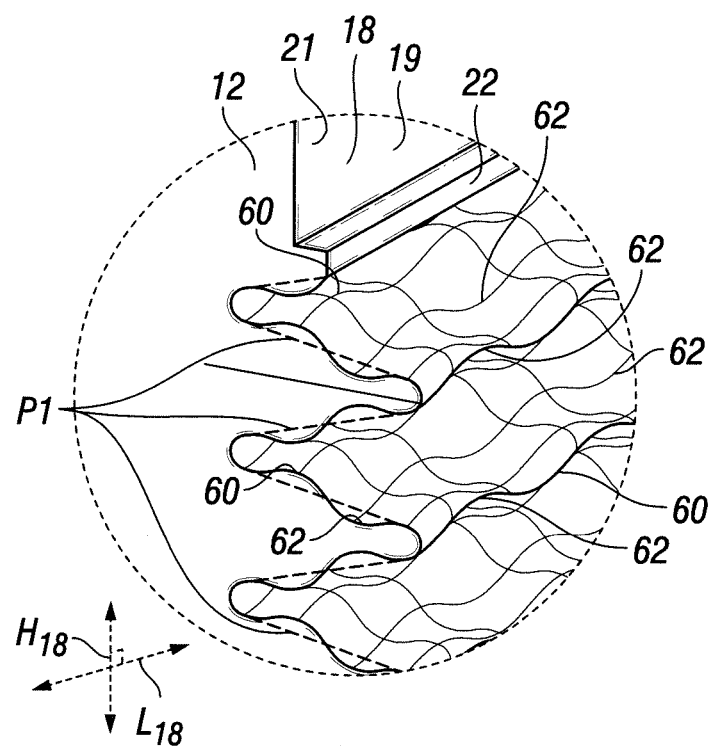
FIG. 10 is a perspective view of one side of the sipe of FIGS. 8 and 9.

With reference to FIGS. 8 to 10, surface geometry features comprising a plurality of projections 60 and corresponding recesses 62 are shown along one of the opposing sides or surfaces 19 of the tread 10 between which the sipe 18 is arranged and defined. The plurality of projections 60 and recesses 62 are spaced along the length and height of the sipe. In the variation shown, the projections and recesses are uniformly spaced apart, although it is appreciated that in other variations, the projections and/or recesses may be uniformly or non-uniformly spaced apart as desired. While the arrangement of projections 60 and recesses 62 is shown to form a generally smooth or rounded contoured surface, it is contemplated that more defined projections and/or recesses may be provided such that the surface is not smoothly contoured, such as where the projections form cylinders, rectangles, or pointed cones, for example. In particular embodiments, the smoothly or rounded contoured surface shown in FIGS. 8-10 comprising a plurality of uniformly spaced projections 60 and recesses 62 represented by a function of $f(x,y)=A*\sin(B*x)*\sin(C*y)$, at least along portions thereof, where A, B, and C are scaling factors. In particular, B and C control the period or spacing between protrusions and recesses, while A controls projection amplitude and recess depth with B and C. The surface generated by this function, which is also represented in the figures, generates an egg crate-like surface. The smooth or rounded contoured surface is also described as extending along an undulating path in two perpendicular directions at particular locations. Accordingly, by varying A, B, and C as desired, the surface geometry described herein may be obtained by one of ordinary skill using said formula. In particular embodiments, the plurality of projections 60 are spaced apart from the middle of one projection to the middle of an adjacent projection, or from peak to peak and have a height (also referred to as an amplitude) measuring 0.025 to 0.375 millimeters (mm) or 0.025 to 0.25 mm in other variations. The height or amplitude is measured from the base or bottom of the projection. In certain embodiments, the plurality of projections are spaced apart by a distance that is less than twice the amplitude $A_{P_1}$ of the first path P1 along which the sipe thickness more generally undulates. Twice the amplitude means the amplitude multiplied by two (2), where the amplitude or height is measured from the base or bottom of the projection. In more particular variations, the projections and recesses are arranged along an undulating path forming a plurality of undulations having a period (which is a spacing from the middle of one projection to the middle of an adjacent projection, or from peak to peak) of 0.1 to 3.0 mm, 0.1 to 2.0 mm, or 0.1 to 1.0 mm, and an amplitude of 0.025 to 0.375 mm or 0.025 to 0.250 in other variations. In such embodiments, twice the amplitude measures the distance between opposing peaks along the undulation within a single period. It is appreciated that the undulations may be formed along the surface without impacting the other side of the sipe, or the sipe thickness may undulate along the undulating path, such that where a projection is formed on one side of the sipe, a recess is formed opposite the projection on the other side of the sipe.

With continued reference to FIGS. 8-10, amplitude $A_S$ and period $P_S$ are shown for the undulating path forming the projections 60 and recesses 62 along the sipe or adjacent tread surface, relative the undulating path P1 along which the sipe thickness or sipe body extends. The amplitude and period of undulating path P1 is represented as $A_{P1}$ and $P_{P1}$, respectively. An arrangement of projections and recesses can also be described as being arranged in an alternating projection-recess arrangement along the length and height of the sipe, such that the opposing sides of the tread are arranged in a mating configuration. Additionally, an arrangement of projections and recesses can be described as being arranged in an alternating arrangement within a plurality of rows, where adjacent rows are shifted relative to each other such that each projection in any row is arranged adjacent to a recess in each adjacent row (columns).

It is appreciated that any one or a plurality of the sipes described herein may be molded into a tire tread in a method of forming a tire tread using a like-shaped sipe-molding member. In the method, a tire tread has a length, a width, and a thickness as described above. In particular embodiments, the method comprising the step of molding into the tread a sipe and a void feature of any variation described herein. As noted above, a sipe-molding member may take the form of the void to be formed in the tread, such as shown in any exemplary embodiment of FIGS. 1-10. Additional steps may include removing the sipe-molding member to provide a like-shaped void.

It is appreciated that any tread discussed herein may be arranged along an annular pneumatic tire, or may be formed separately from a tire as a tire component for later installation on a tire carcass, in accordance with any technique or process known to one of ordinary skill in the art. For example, the treads discussed and referenced herein may be molded with a new, original tire, or may be formed as a retread for later installation upon a used tire carcass during retreading operations. Therefore, when referencing the tire tread, a longitudinal direction of the tire tread is synonymous with a circumferential direction of the tire when the tread is installed on a tire. Likewise, a direction of the tread width is synonymous with an axial direction of the tire or a direction of the tire width when the tread is installed on a tire. Finally, a direction of the tread thickness is synonymous with a radial direction of the tire when the tread is installed on a tire. It is understood that the inventive tread may be employed by any known tire, which may comprise a pneumatic or non-pneumatic tire, for example.

It is appreciated that any of the tread features discussed herein may be formed into a tire tread by any desired method, which may comprise any manual or automated process. For example, the treads may be molded, where any or all discontinuities therein may be molded with the tread or later cut into the tread using any manual or automated process. It is also appreciated that any one or both of the pair of opposing discontinuities may be originally formed along, and in fluid communication with, the outer, ground-engaging side of the tread, or may be submerged below the outer, ground-engaging side of the tread, to later form a tread element after a thickness of the tread has been worn or otherwise removed during the life of the tire.

What is claimed is:

1. A tire tread comprising:
a length extending in a lengthwise direction, the lengthwise direction being a circumferential direction when the tread is arranged on a tire;
a width extending in a lateral direction, the lateral direction being perpendicular to the lengthwise direction;
a thickness extending in a depthwise direction from an outer, ground-engaging side of the tread, the depthwise direction being perpendicular to both the lengthwise direction and the widthwise direction of the tread;
a sipe having a length extending between opposing terminal ends of the sipe, a height, and a thickness that is variable across the length and height of the sipe,
where the sipe thickness includes a first sipe portion arranged between the opposing terminal ends defining the sipe length and having a first thick portion extending at least partially around a perimeter of a first thin portion, the first thick portion being thicker than the first thin portion as measured in a direction of the sipe thickness, and a second sipe portion arranged between the opposing terminal ends defining the sipe length and having a second thick portion extending at least partially around a perimeter of a second thin portion, the second thick portion being thicker than the second thin portion as measured in a direction of the sipe thickness,
where each of the first and second thin portions is substantially 0.2 millimeters or less thick and where the first and second thin portions together form at least 40% of a surface area along each of an opposing side of the sipe, the opposing sides being arranged on opposing sides of the sipe thickness;
a first upright void feature arranged between and in fluid connection with each of the first and second sipe portions;
the first upright void feature extending primarily in a direction of the sipe height, the first upright void feature having a thickness extending in the direction of the sipe thickness equal to or greater than substantially 0.6 millimeter and being greater than the thickness of each of the first and second sipe portions.

2. The tire tread of claim 1, where each of the first and second thick portions are at least 0.5 millimeter thick.

3. The tire tread of claim 1, further comprising:
a second upright void feature arranged along the sipe length between the opposing terminal ends defining the sipe length and in fluid connection with one of the first and second sipe portions,
the second upright void feature extending primarily in a direction of the sipe height,
the second upright void feature having a thickness extending in the direction of the sipe thickness equal to or greater than substantially 0.6 millimeter and being greater than the thickness of the one of the first and second sipe portions.

4. The tire tread of claim 3, where the sipe portion includes a third sipe portion, the third sipe portion having a third thick portion extending at least partially around a perimeter of a third thin portion, the third sipe portion being spaced apart from the first and second sipe portions along the sipe length, where the second upright void feature is arranged between the second and third sipe portions, where the first, second, and third thin portions together form at least 40% of the surface area defining each of the opposing sides of the sipe.

5. The tire tread of claim 4, where the first upright void feature extends a substantial height of each of the first and second sipe portions, where the second upright void feature extends a substantial height of each of the second and third sipe portions, where the first thick portion extends substantially around a perimeter of the first thin portion, where the second thick portion extends substantially around a perimeter of the second thin portion, and where the third thick portion extends substantially around a perimeter of the third thin portion.

6. The tire tread of claim 1, further comprising:
a second upright void feature arranged in fluid connection with the first sipe portion, the first sipe portion arranged between the first and second upright void features in a direction of the sipe length;
a third upright void feature arranged in fluid connection with the second sipe portion, the second sipe portion arranged between the first and third upright void features in a direction of the sipe length;
each of the second and third upright void features extending primarily in a direction of the sipe height;
each of the second and third upright void features having a thickness extending in the direction of the sipe thickness equal to or greater than substantially 0.6 millimeter and being greater than the thickness of each first and second sipe portion.

7. The tire tread of claim 6 further comprising:
a lateral void feature extending primarily in a direction of the sipe length, the lateral void feature having a thickness extending in the direction of the sipe thickness equal to or greater than substantially 0.6 millimeter and being greater than the thickness of each of the first, second, and third upright void features.

8. The tire tread of claim 7, where the lateral void feature is in fluid connection with each of the first, second, and third upright void features.

9. The tire tread of claim 6, where the first upright void feature extends a substantial height of each of the first and second sipe portions, where the second upright void feature extends a substantial height of the first sipe portion, where the third upright void feature extends a substantial height of the second sipe portion, where the first thick portion extends substantially around a perimeter of the first thin portion, and where the second thick portion extends substantially around a perimeter of the second thin portion.

10. The tire tread of claim 1 further comprising:
a lateral void feature extending primarily in a direction of the sipe length, the lateral void feature having a thickness extending in the direction of the sipe thickness equal to or greater than substantially 0.6 millimeter and being greater than the thickness of the first and second sipe portions.

11. The tire tread of claim 10, where the lateral void feature is arranged at a bottom of the sipe in the direction of the tread depth.

12. The tire tread of claim 10, where the lateral void feature at least spans each of the first and second sipe portions in a direction of the sipe length.

13. The tire tread of claim 10, where the lateral void feature extends substantially the full length of the sipe.

14. The tire tread of claim 1, where the thickness of the sipe undulates back and forth forming a plurality of undulations in a direction of the sipe thickness as the sipe extends in a direction of the sipe height and/or width to form a plurality of undulations.

15. The tire tread of claim 14, where each of the plurality of undulations have an amplitude of at least 1 millimeters.

16. The tire tread of claim 14, where the plurality of undulations are spaced apart by a distance of at least 1.0 millimeters.

17. A method of forming a tire tread, the tread having: a length extending in a lengthwise direction, the lengthwise direction being a circumferential direction when the tread is arranged on a tire; a width extending in a lateral direction, the lateral direction being perpendicular to the lengthwise direction; and, a thickness extending in a depthwise direction from an outer, ground-engaging side of the tread, the depthwise direction being perpendicular to both the lengthwise direction and the widthwise direction of the tread, the method comprising the step of:
molding into the tread a sipe as recited in claim 1.

18. The tire tread of claim 1, where the first upright void feature extends a substantial height of each of the first and second sipe portions, where the first thick portion extends substantially around a perimeter of the first thin portion, and where the second thick portion extends substantially around a perimeter of the second thin portion.

* * * * *